UNITED STATES PATENT OFFICE.

CARL SCHEIBLER, OF BERLIN, GERMANY.

PROCESS OF TREATING PHOSPHATIC SLAG.

SPECIFICATION forming part of Letters Patent No. 312,904, dated February 24, 1885.

Application filed November 11, 1884. (No specimens.)

*To all whom it may concern:*

Be it known that I, CARL SCHEIBLER, doctor of philosophy and professor, of Berlin, Prussia, German Empire, have invented certain new and useful Improvements in the Treatment of Phosphatic Slags, of which the following is a specification.

My invention relates to the utilization of phosphatic slags, especially those obtained by the dephosphorization of iron by the Thomas process, and has for its object to extract therefrom the phosphoric acid as phosphate of lime, to be used for agricultural purposes, and to obtain a residue rich in iron and manganese, which may be returned to the blast-furnace.

The said invention consists in concentrating both the phosphoric acid and the iron and manganese within the slag itself in such a manner that the slag can easily be separated into two portions, one of which contains the greater part of the phosphoric acid and but little iron, whereas the other portion holds the greater part of the iron and manganese nearly free from phosphoric acid.

I have found, by a series of experiments made on a large scale, that when fluid phosphatic slags are kept for some time in liquid state and allowed to slowly cool down without being moved a transposition of the constituents of the same takes place in such a manner that the upper part of the liquid mass grows richer and richer in phosphoric acid, while the iron and manganese settle toward the bottom. By separating the mass into an upper portion and a lower one the greater part of the phosphoric acid contained in the bulk of slag will be found in the former, whereas the latter contains the greatest part of the iron and manganese present with but little phosphoric acid. By thus proceeding I have, for instance, separated slags obtained by the Thomas process into one portion containing thirty-five per cent. of phosphoric acid with fifty-seven per cent. of lime, and another portion containing only 7.8 per cent. of phosphoric acid with thirty-seven per cent. of lime, but 33.7 per cent. of iron, the totality of iron present in the slag having been but 13.9 per cent. In another experiment, where I caused the cooling to pass less slowly, that portion which first solidified contained 16.2 per cent. of phosphoric acid, 14.0 per cent. of iron, and 45.7 per cent. of lime, whereas the liquid portion removed therefrom contained 21.8 per cent. of phosphoric acid, 10.5 per cent. of iron, and 52.7 per cent. of lime. It is evident by these experiments that the separation of the constituents will be the more efficacious the longer the slag is kept in liquid state, and the more slowly the cooling is allowed to take place. By maintaining the slag sufficiently long in liquid condition—*i. e.*, by retarding as much as possible its cooling down—a separation of the same takes place into phosphate of lime and into ferrate and manganate of lime nearly free from phosphoric acid.

In carrying my invention into practice, I prefer to pour the liquid slag into vessels coated with a bad conductor of heat, and to put these vessels when filled in a room protected against the access of cold air, where they remain until the outer surface of the slag contained therein begins to solidify. The inner fluid mass is then removed. It contains the greater part of the phosphate of lime and is utilized for the manufacture of manure. The outer crust, consisting of the portion rich in iron and manganese, may be returned to the blast-furnace.

I claim as my invention—

The described method of concentrating the phosphoric acid contained in the phosphatic slag on the one part, and the iron and manganese on the other part, so as to permit of the same being removed separately, this method consisting in exposing the fluid slag to slow cooling, whereby a transposition of the constituents forming the slag takes place.

In testimony whereof I have signed my name to this specification in the presence of two subscribing witnesses.

CARL SCHEIBLER.

Witnesses:
B. ROI,
HENRY SPRINGMANN.